US006291385B1

(12) United States Patent
Lee et al.

(10) Patent No.: US 6,291,385 B1
(45) Date of Patent: Sep. 18, 2001

(54) CATALYST FOR POLYMERIZATION OR COPOLYMERIZATION OF OLEFIN

(75) Inventors: Young-Sub Lee; Youn-Kyung Kang, both of Taejon (KR)

(73) Assignee: Samsung General Chemicals Co., Ltd. (KR)

( * ) Notice: Subject to any disclaimer, the term of this patent is extended or adjusted under 35 U.S.C. 154(b) by 0 days.

(21) Appl. No.: 09/268,552

(22) Filed: Mar. 15, 1999

(30) Foreign Application Priority Data

Dec. 30, 1998 (KR) .................................................. 98/62150

(51) Int. Cl.$^7$ ............................. B01J 31/00; B01J 37/00; C08F 4/02; C08F 4/60

(52) U.S. Cl. ........................... 502/111; 502/110; 502/127; 502/132; 502/133

(58) Field of Search ................................... 502/110, 111, 502/127, 132, 133

(56) References Cited

U.S. PATENT DOCUMENTS

| | | |
|---|---|---|
| 4,069,169 | 1/1978 | Toyoda et al. . |
| 4,071,672 | 1/1978 | Kashiwa . |
| 4,071,674 | 1/1978 | Kashiwa et al. . |
| 4,076,924 | 2/1978 | Toyota et al. . |
| 4,085,276 | 4/1978 | Toyota et al. . |
| 4,107,413 | 8/1978 | Giannini et al. . |
| 4,107,414 | 8/1978 | Giannini et al. . |
| 4,156,063 | 5/1979 | Giannini et al. . |
| 4,157,435 | 6/1979 | Toyota et al. . |
| 4,187,196 | 2/1980 | Giannini et al. . |
| 4,220,554 | 9/1980 | Scatá et al. . |
| 4,226,963 | 10/1980 | Giannini et al. . |
| 4,315,835 | 2/1982 | Scatá et al. . |
| 4,315,874 | 2/1982 | Ushida et al. . |
| 4,330,649 | 5/1982 | Kioka et al. . |
| 4,336,360 | 6/1982 | Giannini et al. . |
| 4,399,054 | 8/1983 | Ferraris et al. . |
| 4,401,589 | 8/1983 | Kioka et al. . |
| 4,439,540 | 3/1984 | Cecchin et al. . |
| 4,613,655 | 9/1986 | Longi et al. . |
| 4,806,433 | 2/1989 | Sasaki et al. . |
| 4,866,022 | 9/1989 | Arzoumanidis et al. . |
| 4,912,074 | 3/1990 | Miro . |
| 4,946,816 | 8/1990 | Cohen et al. . |
| 4,952,649 | 8/1990 | Kioka et al. . |
| 4,978,648 | 12/1990 | Barbé et al. . |
| 4,988,656 | 1/1991 | Arzoumanidis et al. . |
| 4,990,479 | 2/1991 | Ishimaru et al. . |
| 5,013,702 | 5/1991 | Arzoumanidis et al. . |
| 5,081,090 | 1/1992 | Arzoumanidis et al. . |
| 5,124,297 | 6/1992 | Arzoumanidis et al. . |
| 5,134,104 | 7/1992 | Sasaki et al. . |
| 5,175,332 | 12/1992 | Chatterton et al. . |
| 5,182,245 | 1/1993 | Arzoumanidis et al. . |
| 5,502,128 | 3/1996 | Flores et al. . |
| 5,780,378 | 7/1998 | Toida et al. . |
| 5,844,046 | 12/1998 | Ohgizawa et al. . |
| 5,849,654 | 12/1998 | Fushimi et al. . |

FOREIGN PATENT DOCUMENTS

| | | |
|---|---|---|
| 0 602 922 | 6/1994 | (EP) . |
| 0 606 125 | 7/1994 | (EP) . |
| 58-83006 | 5/1983 | (JP) . |
| 63-54004 | 10/1988 | (JP) . |

OTHER PUBLICATIONS

Invention Abstract for Pub. No. 63–191811 (JP), Pub. Date Aug. 9, 1988.
Invention Abstract for Pub. No. 63–40711 (JP), Pub. Date Dec. 13, 1994.
Tinkler et al., "Polymerisation of ethene by the novel titanium complex [Ti(Me$_3$SiN CH$_2$CH$_2$NSiMe$_3$) Cl$_2$]; a metallocene analogue," Chem. Commun., 1996, pp. 2623–2624. no month.
Edelmann, "N–silylated benzamidines: versatile building blocks in main group and coordination chemistry," Coordination Chemistry Reviews, 137, 1994, pp. 403–481. no month.
Zhou et al., "Synthesis and Structure of Novel Bridged Dinuclear Indium Complexes," Inorg. Chem. 1996, 35, pp. 1423–1424. no month.
Zhou et al., "Bulky Amidinate Complexes of Tin(IV). Synthesis and Structure of Sn(RNC(R')NR)$_2$Cl$_2$ (R=Cyclohexyl, R'=H, Me; R=SiMe$_3$, R'=$^t$Bu)," Inorg. Chem. 1997, 36, pp. 501–504. no month.
Linden et al., "Polymerization of α–Olefins and Butadiene and Catalytic Cyclotrimerization of 1–Alkynes by a New Class of Group IV Catalysts. Control of Molecular Weight and Polymer Microstructure via Ligand Tuning in Sterically Hindered Chelating Phenoxide Titanium and Zirconium Species," J. Am. Chem. Soc. 1995, 117, pp. 3008–3021. no month.
Stokes et al, "Reactions of Cobaloxime Anion and/or Hydrides with Enynes as a New, General Route to 1,3– and 1,2–Dienylcobaloxime Complexes," Organometallics 1996, 15, pp. 2624–2632. no month.

*Primary Examiner*—Elizabeth D. Wood
*Assistant Examiner*—J. Pasterczyk
(74) *Attorney, Agent, or Firm*—Conley, Rose & Tayon, PC; Eric B. Meyertons

(57) ABSTRACT

The present invention relates to a catalyst for polymerization or copolymerization of an olefin. The catalyst is produced by first reacting a mixture of a magnesium compound and an aluminum compound with an ester compound which has at least one hydroxy group and a silane compound which has at least one alkoxy group, and next reacting with a titanium compound. The catalyst may be used in the polymerization or copolymerization of ethylene and propylene. The catalyst is believed to have the following formula:

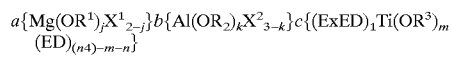

$a\{Mg(OR^1)_jX^1_{2-j}\}b\{Al(OR_2)_kX^2_{3-k}\}c\{(ExED)_lTi(OR^3)_m(ED)_{(n4)-m-n}\}$ where, $R^1 \sim R^3$=hydrocarbon group, $X^1 \sim X^2$=halogen atoms, ExED=silane compounds comprising an alkoxy group, ED=an ester compound having at least one hydroxy group and a hydrogen of the hydroxy group is removed, and $0 < a+b+c \leq 1$; $0 \leq j \leq 2$, $0 \leq k \leq 3$, $0 \leq l \leq 1$; $0 \leq m \leq 4$; $0 \leq n \leq 4$; $0 \leq m+n \leq 4$; and a, b, c, l, m, and n are all positive numbers.

11 Claims, No Drawings

CATALYST FOR POLYMERIZATION OR COPOLYMERIZATION OF OLEFIN

BACKGROUND OF INVENTION

The present invention, which is the improvement of U.S. Pat. No. 5,459,116, relating to a catalyst for polymerization and copolymerization of olefin, particularly relates to a catalyst for production of polymers, which has high activity and provides polymer with narrow molecular weight distribution, and narrow particle size distribution, yielding small amount of low polymers.

Prior arts in olefin polymerization or copolymerization are the two: either production of solid catalytic components by reacting, with a halogen-containing titanium compound, the compound produced by reaction of a magnesium compound with alcohol, organic carboxylic acid, aldehyde, and amine and their mixture, in an inert hydrocarbon solvent; or production of solid titanium catalytic components by first producing an active carrier by the use of a halogen-containing silicon compound, tin compound, or an aluminum compound as recrystallized compounds, and next by contacting it with a titanium halide compound.

Now, U.S. Pat. Nos. 4,336,360 and 4,330,649 describe a method for producing a polymerization catalyst with high activity containing titanium components, by liquefying a magnesium carrier by reacting it with an electron donor such as alcohol in a hydrocarbon solvent, reacting it with such a halogen compound as silicon tetrachloride, which is a recrystallization process of the magnesium carrier component, in order to produce a solid magnesium carrier, and after all these processes, by having it supported by such a titanium compound as titanium tetrachloride, or by having it precipitated by pouring in titanium tetrachloride. But when olefin is polymerized or copolymerized with the use of a catalyst produced in the way given above, the resultant polymer has too much of fine powder, the particle size distribution being broad, and the bulk density low. Other defects include a rather broad molecular weight distribution and the yield of so much of low polymer soluble in such a solvent as hexane at the time of slurry polymerization. Here, a low polymer means a polymer which usually has a melting index of over 5000 and a molecular weight of under 1000.

U.S. Pat. No. 5,419,116, on the other hand, describes a method for producing a solid polymerization catalyst containing a magnesium compound, titanium compound, and electron donor components, for the purpose of remedying such defects of conventional catalysts as indicated above and yielding a catalyst possessed of a high activity, greater bulk density, by first liquefying a magnesium compound by reacting it with an electron donor such as alcohol in a hydrocarbon solvent, then, after reacting it with an ester compound having at least one hydroxy group, getting it to precipitate by reacting with such a titanium compound as titanium tetrachloride.

However, if olefin polymerization or copolymerization is performed with the use of such a catalyst produced that way, the catalyst does show a high activity and the resultant polymer has a merit of relatively high bulk density, but it nevertheless has such demerits as a broad particle size distribution, a broad molecular weight distribution, and a large yield of low polymer soluble in the solvents such as hexane at slurry polymerization.

SUMMARY OF INVENTION

The target of the present invention is to remedy all such defects of conventional catalysts as listed above and produce a new highly active catalyst to result in a polymer of granular grains, a narrow molecular weight distribution, high bulk density, a narrow particle size distribution, and also a minimum yield of low polymer if impossible to avoid low-density polymer at all.

DETAILED DESCRIPTION OF INVENTION

The catalyst of the present invention is characterized in that it utilizes, as inorganic substance, the mixture obtained by addition of an aluminum compound to a magnesium compound, and, as electron donor, an ester compound having at least one hydroxy group and a silane compound having at least one alkoxy group. In case the solid titanium catalyst of the present invention is used in polymerization the resultant polymer is one of a narrow molecular distribution and granular form of a narrow particle size distribution, the yield of low polymer being remarkably decreased.

A more detailed description of the invention is as follows:

The catalyst of the present invention is produced by (1) producing a liquid magnesium solution by reacting a mixture of a magnesium compound and an aluminum compound with alcohol in a solvent of inert hydrocarbon, (2) getting the liquefied magnesium solution to react with an ester compound having at least one hydroxy group and a silane compound having at least one alkoxy group, as electron donors, and then by reacting it by addition of a titanium compound.

The magnesium compounds used in production of the catalyst of the present invention may include such magnesium halides as magnesium fluoride, magnesium chloride, magnesium bromide, and magnesium iodide; such alkoxy magnesium halides as methoxymagnesium chloride, ethoxymagnesium chloride, isopropoxymagnesium chloride, and butoxymagnesium chloride; and such magnesium alkoxides as magnesium ethoxide, magnesium isopropoxide, and magnesium butoxide, etc.

The aluminum compounds used in production of the catalyst of the present invention may include such aluminum halides as aluminum fluoride, aluminum chloride, aluminum bromide, aluminum iodide; such aluminum alkoxides as aluminum trimethoxide, aluminum triethoxide, aluminum triisopropoxide, and aluminum tributoxide; aluminum hydroxide; etc. As to the quantity of aluminum compounds for use, according to that of magnesium for basis, preferably 0.01~2 mole, more preferably 0.05~1 mole, to 1 mol of magnesium is suitable in order to successfully obtain the desired properties of the catalyst.

As the solvent for production of the liquid magnesium solution, a hydrocarbon solution is used, and such aliphatic hydrocarbons as hexane, heptane, octane, decane, and kerosine, such cycloaliphatic hydrocarbons as cyclohexane and cyclooctane, and such aromatic hydrocarbons as benzene, toluene, xylene, and ethylbenzene can all be used. The quantity will, by that of magnesium as basis, preferably be 1~30 mole, more preferably 3~10 mole to each mol of magnesium.

Alcohols used in production of the liquid magnesium solution will include such aliphatic alcohols as methanol, ethanol, butanol, isopropanol, hexanol, 2-ethylhexanol, and decanol; such cycloaliphatic alcohols as cyclohexanol; such aromatic alcohols as phenol; etc. The quantity will be 0.1~10 mols to each mol of magnesium. The quantity of alcohol used to produce even liquid form of a magnesium compound is most preferably about 3~6 mole. The contact temperature of the magnesium compound and alcohol is preferably about 60~140 C., more preferably about 80~120 C., to be kept for one to four hours.

The ester compound having at least one hydroxy group, among the electron donors to react with the liquid magnesium solution in production of the catalyst of the present invention, may include such unsaturated aliphatic esters having at least one hydroxy group as 2-hydroxyethyl acrylate, 2-hydroxyethyl methacrylate, 2-hydroxypropyl acrylate, 2-hydroxypropyl methacrylate, 4-hydroxybutyl acrylate, pentaerythritol triacrylate; such aliphatic monoesters or polyesters having at least one hydroxy group as 2-hydroxyethyl acetate, methyl-3-hydroxy butylate, ethyl-3-hydroxy butylate, methyl-2-hydroxy isobutylate, ethyl-2-hydroxy isobutylate, methyl-3-hydroxy-2-methyl propionate, 2,2-dimethyl-3-hydroxy propionate, ethyl-6-hydroxy hexanoate, t-butyl-2-hydroxy isobutylate, diethyl-3-hydroxy glutarate, ethyl lactate, isopropyl lactate, butyl lactate, butylisobutyl lactate, isobutyl lactate, ethyl mandelate, dimethyltartrate, diethyltartrate, dibutyltartrate, trimethyl citrate, triethyl citrate, ethyl-2-hydroxy caproate, and diethyl bis-(hydroxy methyl)malonate; such aromatic esters having at least one hydroxy group as 2-hydroxyethyl benzoate, 2-hydroxy ethyl salicylate, methyl 4-(hydroxy methyl) benzoate, methyl 4-hydroxy benzoate, ethyl 3-hydroxy benzoate, 4-methyl salicylate, ethyl salicylate, phenyl salicylate, propyl4-hydroxy benzoate, phenyl-3-hydroxy naphtanoate, monoethyleneglycol monobenzoate, diethyleneglycol monobenzoate, triethyleneglycol monobenzoate; such lipocyclic esters having at least one hydroxy group as hydroxy butyrolactone; etc. The quantity of such electron donors, by magnesium for standard, is preferably 0.01~5 mole, more preferably 0.05~1.0 mole to each mol of magnesium. Out of these ranges, it would be difficult to obtain the desired level in properties of the catalyst.

For the silicon compound having at least one alkoxy group, that is, the other electron donor in the present invention, such a compound as represented by a formula: RnSi(OR)4-n (here, R is hydrocarbon with 1 to 6 carbons, n is an integer of 0, 1, 2, or 3) is preferable, but more preferably any of such compounds as having at least two or more alkoxy group. Particularly, such compounds are preferable for use as dimethyldimethoxysilane, dimethyldiethoxysilane, diphenyldimethoxysilane, methylphenyl-methoxysilane, diphenyldiethoxysilane, ethyltrimethoxysilane, vinyltrimethoxysilane, methyltrimethoxysilane, phenyltrimethoxysilane, methyltriethoxysilane, ethyltriethoxysilane, vinyltriethoxysilane, butyltriethoxysilane, phenyltriethoxysilane, ethyltriisopropoxysilane, vinyltributoxysilane, tetraethylorthosilicate, tetrabutylorthosilicate, etc. The quantity, by magnesium as basis, is preferably 0.01~2 mole, more preferably 0.1~1.0 mole to each mole of magnesium. Getting out of these ranges would make it difficult to attain the aimed properties of the catalyst.

The temperature for reaction of the liquid mixture of a magnesium compound and an aluminum compound with the ester compound having hydroxy group is, preferably, in the range of 30~100 C., and more preferably in the range of 50 80° C. The temperature for reaction of the said liquid mixture of a magnesium compound and an aluminum compound with a silane compound which is one of the electron donors and has alkoxy group is preferably in the range of 0~50° C., and more preferably in the range of 10~40° C. The sequence to react the ester compound having a hydroxy group and the silane compound having an alkoxy group which are used as electron donors in the present invention with the liquid mixture of a magnesium compound and an aluminum compound is not fixed.

The solid catalyst of the present invention is produced, as has been described above, by first reacting a liquid mixture of a magnesium compound and an aluminum compound with an electron donor, and next by adding thereto a titanium compound.

For the titanium compound to react with the liquid magnesium compound having electron a donor added thereto, is preferably a compound represented by a general formula: $Ti(OR)_m X_{4-m}$. In this formula R, being hydrocarbon group, is an alkyl group with 1 to 10 carbons; X halogen atom, m an integer, O m 4. Examples of titanium compounds include such tetrahalogen titaniums as $TiCl_4$, $TiBr_4$, and $TiI_4$; such trihalogen alkoxytitaniums as $Ti(OCH_3)Cl_3$, $Ti(OC_2H_5)Cl_3$, $Ti(OC_4H_9)Cl_3$, $Ti(OC_2H_5)Br_3$, and $Ti(O(i-C_2H_5))Br_3$; such dihalogen alkoxytitaniums as $Ti(OCH_3)_2Cl_2$, $Ti(OC_2H_5)_2Cl_2$, $Ti(OC_4H_9)_2Cl_2$, and $Ti(OC_2H_5)_2Br_2$; such halogenated alkoxytitaniums as $Ti(OCH_3)_3Cl$, $Ti(OC_2H_5)_3Cl$, and $Ti(OC_4H_9)_3Cl$; and such tetraalkoxytitaniums as $Ti(OC_2H_5)_4$ and $Ti(OC_4H_9)_4$. Of all these tetrahalogen titaniums are preferable, and especially titanium tetrachloride is more preferable. The quantity of such titanium compounds is, by that of magnesium as basis, preferably 1.0~15 mole, and more preferably 1.0~0.8 mole to each mol of magnesium in order to successfully obtain the desired properties of the catalyst.

The temperature for reaction of an electron donor-added liquid magnesium solution and a titanium compound is preferably −10~40° C., and more preferably 0~30° C. After addition of a titanium compound is completed the reaction temperature is raised finally to keep preferably at 40~130° C., more preferably at 50~110° C., and it is preferable to let the reaction continue for 30 minutes to four hours. The catalyst produced in this way must be washed by the use of refined hexane or heptane until no remnant titanium is detected. then it is dried and thus the production of the desired solid titanium catalyst is completed.

The solid titanium catalyst of the present invention exists as a compound produced by a coordinate bond of a magnesium compound, aluminum compound, and a quadrivalent titanium with a compound, from which hydrogen of the hydroxy group of an ester compound having halide and alkoxy and/or at least one or more hydroxy group is lost while reacting with a liquid titanium compound, and with a silane compound having an alkoxy group. Expressed in a general formula it can be indicated by $a\{Mg(OR^1)_j X^1_{2-j}\} b\{Al(OR^2)_k X^2_{3-k}\} c\{(ExED)_l Ti(OR^3)_m (ED)_{n4-m-n}\}$ ($R^1$~$R^3$=hydrocarbon group, $X^1$~X=atom, ExED=silane compound having alkoxy group, ED=a compound obtained from which hydrogen of an ester compound having hydroxy group is rid of while reaction with titanium compound: $0 \leq a+b+c \leq 1$; $0 \leq j \leq 2$, $0 \leq k \leq 3$, $0 \leq l \leq 1$; $0 \leq m+n \leq 4$; where a, b, c, l, m, and n are all positive numbers, and j and k are integers.)

When the solid titanium catalyst of the present invention is used in polymerization or copolymerization of olefin, the temperature for reaction is to be in the range of room temperature to about 150° C., and preferably 50 to 110° C. The reaction pressure is in the range of 1 kg/cm² to 50 kg/cm², and preferably about 2 to 35 kg/cm². In the process of polymerization, generally, the devices of the batch type, continuous or semi-continuous types are used, and a multi-step reacting system can also be used for simultaneous operation of more than one reactors. In whatever means of operation for polymerization or copolymerization of olefin, the solid catalyst of the present invention can be used.

The polymers produced by the use of the solid titanium catalyst of the present invention are found a granular form, of narrow particle size distribution and high bulk density. Besides, the molecular weight distribution is narrow, and, characteristically, the yield of low polymer from slurry polymerization is remarkably low.

Below, the present invention is described in further detail, referring to the examples of embodiment. However, the present invention is not limited by the examples.

For measuring the content of low polymer from what was produced in the examples, 100 ml was taken from the slurry mixture of hexane and polymer, and the low polymer was extracted with hexane by Soxhlet extractor for an hour. From the weight of low polymer thus obtained, the content of low polymer was measured by the following formula:

$$\text{content of low polymer(wt. \%)} = \frac{\text{weight of low polymer (g)}}{\text{wt. of dried high mol. wt. pol.(g)} + \text{wt. of low pol.(g)}} \times 100$$

The analysis of the particle sizes of the polymer produced in the examples was performed with the use of Malvern Particle Size Analyzer, and SPAN has been calculated by the following formula:

$$SPAN = \frac{(D_{90} - D_{10})}{D_{50}} \quad (D_x = \text{particle size in} \times \text{wt \%})$$

EXAMPLE 1
(Production of Catalyst)

Under the dried nitrogen atmosphere, 19.1 g (0.2 mol) of anhydrous magnesium chloride and 2.7 g (0.02 mol) of anhydrous aluminum chloride were suspended in 200 ml of refined toluene; 126 ml (0.4 mol) of 2-ethyl-hexanol was added thereto; the resultant mixture was heated slowly while stirring; and it was kept reacting at 130° C. for an hour and a half; whereupon, no solid matter was left at all, and only the transparent solution was obtained. This solution was cooled to 70° C., 2.4 ml (0.02 mol) of 2-hydroxyethyl methacrylate was added thereto, and left alone for one hour. The solution was then cooled to 20° C., 10 ml (0.045 mol) of tetraethylorthosilicate was instilled into, and 141 ml (1.28 mol) of titanium tetrachloride was dripped on for three hours. Afterwards, the solution was heated to 80° C., taking two hours, and left alone for an hour. When the reaction was finished it was washed in hexane, whereby the solid catalyst was obtained, its quantity of titanium being found to be 4.4 wt %.

(Polymerization Experiment)

1 liter of refined hexane was put into a 2-liter autoclave, and under the nitrogen atmosphere 3.0 mmol of triethylaluminum and 0.03 mmol of titanium component of the catalyst were further charged into the autoclave. Under 1.7 atm of hydrogen gas, hydrogen was charged into the reactor, of which the temperature was subsequently raised to 70° C., and then 0.1 atm of butene-1 was charged into the reactor. Ethylene was added in the reactor so continuously as to make the overall pressure of the reactor 5.5 atm. The results of polymerization are shown in Table 1.

EXAMPLE 2

The solid titanium catalyst was produced in exactly the same way as in Example 1, except that 20 ml (0.09 mol) of tetraethylorthosilicate was added. The catalyst's titanium quantity was determined to be 4.2 wt %. The results of polymerization are given in Table 1, as are the results of Example 1.

EXAMPLE 3

The solid titanium catalyst was produced in exactly the same way as in Example 1, except that 5 ml (0.023 mol) of tetraethylorthosilicate was added. The quantity of titanium was determined to be 4.5 wt %. The results of polymerization are given in Table 1.

EXAMPLE 4

The solid titanium catalyst was produced in exactly the same way as in Example 1, except that 5.4 g (0.04 mol) of aluminum chloride was added. The quantity of titanium was determined at 4.2 wt %. The results of polymerization are given in Table 1.

EXAMPLE 5

The solid titanium catalyst was produced in exactly the same way as in Example 1, except that 2-hydroxyethylmethacrylate was added at 20° C. The quantity of titanium was determined at 4.0 wt %. The results of polymerization are given in Table 1.

EXAMPLE 6

The solid titanium catalyst was produced in exactly the same way as in Example 1, except that titanium tetrachloride was dripped on at 10° C. The quantity of titanium was determined at 4.5 wt %. The results of polymerization are given in Table 1.

Comparative Example 1
(Production of Catalyst)

Under the nitrogen atmosphere, 19.1 g (0.2 mol) of anhydrous magnesium chloride and 2.7 g (0.02 mol) of anhydrous aluminum chloride were suspended on 200 ml of refined toluene; 126 ml (0.4 mol) of 2-ethyihexanol was added thereto; the resultant mixture was heated slowly while stirring; and it was kept reacting at 130° C. for an hour; whereupon, no solid matter was left at all, and only transparent solution was obtained. This solution was cooled to 70° C., 2.4 ml (0.02 mol) of 2-hydroxyethyl methacrylate was added thereto, and it was left alone for one hour. The solution was cooled to 20° C., and 141 ml (1.28 mol) of titanium tetrachloride was dripped on for three hours. After the aforesaid dripping was completed, the solution was heated to 80° C., taking two hours, and kept alone for an hour. When the reaction was finished it was washed in hexane, and thus the solid catalyst was obtained, its quantity of titanium being found 4.6 wt %.

(Polymerization experiment)

1 liter of refined hexane was poured in a 2-liter autoclave, and in a nitrogenous atmosphere 3.0 mmol of triethylaluminum and 0.03 mmol of titanium component of the catalyst were further charged into the autoclave. Under 1.7 atm of hydrogen gas, hydrogen was charged into the reactor, of which the temperature was subsequently raised to 70° C., and then 0.1 atm of butene-1 was charged into the reactor. Ethylene was added in the reactor so continuously as to make the overall pressure of the reactor 5.5 atm. The results of polymerization are shown in Table 1.

Comparative Example 2

The catalyst was produced in exactly the same way as in Comparative Example 1, except that after the production of the colorless transparent magnesium/aluminum solution was produced it was directly cooled to 20° C. without addition of 2-hydroxyethylmethacrylate, and 10 ml (0.045 mol) of tetraethylorthosilicate was added thereto. The quantity of titanium of the catalyst was found 4.2 wt %. Polymerization was performed as in Comparative Example 1, the result thereof being given in Table 1.

Comparative Example 3

The catalyst was produced in exactly the same way as in Comparative Example 2, except that the aluminum compound was not used. The catalyst's titanium quantity being found to be 4.7 wt %. Polymerization was performed in exactly the same way as in Comparative Example 1, the results thereof being given in Table 1.

EXAMPLE 7

Under the nitrogen atmosphere, 19.1 g (0.2 mol) of anhydrous magnesium chloride and 2.7 g (0.02 mol) of anhydrous aluminum chloride were suspended in 200 ml of refined toluene; 126 ml (0.4 mol) of 2-ethyl-hexanol was added thereto; the resultant mixture was heated slowly while stirring; and it was kept reacting at 130° C. for an hour and a half; whereupon, no solid matter was left at all, and only transparent solution was obtained. 8 ml of diisophthalate was added thereto, and the solution was kept as it was left alone for one hour. The solution was then cooled to 20° C., 10 ml (0.02 mol) of 2-hydroxyethyl methacrylate was added thereto, and left alone for one hour. The solution was then cooled to 20° C., 10 ml (0.045 mol) of tetraethylorthosilicate was instilled into, and 440 ml (4 mol) of titanium tetrachloride was dripped on for three hours. After the aforesaid dripping was finished, the solution was heated to 90° C., in two hours, and left alone for two hours. When the reaction was finished, 4.8 g (0.028 mol) of monoethyleneglycol monobenzoate was added thereto, the temperature was raised to 100° C., and the reaction was left to continue for one hour. After the reaction, the produced precipitate was washed five times in 400 ml of refined toluene. 200 ml of refined toluene was added thereto, 440 ml (4 mol) of titanium tetrachloride was dripped on, and the mixture was stirred at 100° C. for two hours, and thereby it was activated. After the reaction was finished it was washed in hexane, and thus the solid catalyst was obtained. Its quantity of titanium was 4.0 wt %.

(Polymerization Experiment)

30 mg of the produced catalyst was put in a 5 ml vial, and installed in a 2 L autoclave. Under the nitrogen atmosphere, 1 liter of refined hexane was instilled; 10 mmol of triethylaluminum and 1.0 mmol of cyclohexylmethyldimethoxysilane were also instilled. Thereafter 600 ml of hydrogen was further charged into the reactor, which was then heated to 70° C. A propylene gas which had experienced oxygen scavenger and molecular sieve trap was led to pass through a mass flow controller and then charged into the reactor. When the propylene reached the equilibrium state between gas and liquid at 6 bar of overall pressure in the reactor, the vial in the reactor was broken, to initiate the polymerization reaction of propylene, and then the polymerization reaction proceeded for one hour. The results of polymerization for one hour are given in Table 2.

EXAMPLE 8

The solid titanium catalyst was produced in exactly the same way as in Example 8, except that 200 ml (0.045 mol) of tetraethylorthosilicate was instilled. The quantity of titanium of the catalyst was found 3.8 wt %. The results of the polymerization, performed as in EXAMPLE 8, are given in Table 2.

Comparative Example 4

The solid titanium catalyst was produced in exactly the sam way as in Example 8, except that the aluminum compound and tetraethylorthosilicate were not added. The quantity of titanium of the catalyst was found 4.3 wt %. The results of polymerization, performed as in Example 8, are given in Table 2.

TABLE 1

Results of Ethylene Polymerization

| Emb. exmp. | Ti content (wt. %) | Activity (kg-PE/mmol-Ti) | bulk dens. (g/ml) | melting index (g/10 min) | dist. of mol. wt. (MFRR) ($MI_{21.6}/MI_{2.16}$) | content of low polymer (wt. %) | SPAN |
|---|---|---|---|---|---|---|---|
| 1 | 4.4 | 1.79 | 0.40 | 13.3 | 23.9 | 2.0 | 1.06 |
| 2 | 4.2 | 1.70 | 0.42 | 14.7 | 22.9 | 1.9 | 0.99 |
| 3 | 4.5 | 1.82 | 0.39 | 11.1 | 25.1 | 2.0 | 1.09 |
| 4 | 4.2 | 1.71 | 0.38 | 10.8 | 23.6 | 2.0 | 1.07 |
| 5 | 4.0 | 2.03 | 0.41 | 12.6 | 23.5 | 1.8 | 0.99 |
| 6 | 4.5 | 1.81 | 0.38 | 13.4 | 23.7 | 2.1 | 1.10 |
| Com. exmp. | 4.6 | 1.98 | 0.36 | 11.5 | 29.4 | 5.2 | 1.49 |
| Com. exmp. | 4.2 | 1.54 | 0.37 | 11.9 | 25.1 | 2.2 | 1.14 |
| Com. exmp. | 4.7 | 1.64 | 0.36 | 6.4 | 30.1 | 5.6 | 1.27 |

TABLE 2

Results of Polymerization of Propylene

| Emb. exmp. | Ti density (wt. %) | produced amount of polyproylene | bulk density (g/ml) | melting index (g/10 min) | SPAN |
|---|---|---|---|---|---|
| 7 | 4.0 | 169 | 0.40 | 2.8 | 1.032 |
| 8 | 3.8 | 157 | 0.42 | 2.7 | 0.981 |
| Com. exmp. 4 | 4.3 | 178 | 0.34 | 2.9 | 1.350 |

According to the present invention it is possible, as seen above, to provide a new catalyst which, being highly active, helps produce polymers of narrow particle size distribution, narrow molecular weight distribution, high bulk density, and also can decrease yield of the undesirable low polymer.

What is claimed is:

1. A method for forming a catalyst for polymerization of an olefin, comprising:

reacting a mixture of a magnesium compound and an aluminum compound with an ester compound having at least one hydroxy group and a silane compound having at least one alkoxy group to produce an intermediate product; and reacting the intermediate product with a titanium compound.

2. The method of claim 1, wherein the aluminum compound is selected from the group consisting of aluminum fluoride, aluminum chloride, aluminum bromide, aluminum iodide, aluminum trimethoxide, aluminum triethoxide, aluminum triisopropoxide, aluminum tributoxide and aluminum hydroxide.

3. The method of claim 1, wherein the ester compound having at least one hydroxy group comprises unsaturated aliphatic esters having at least one hydroxy group, aliphatic monoesters having at least one hydroxy group, aliphatic polyesters having at least one hydroxy group, aromatic esters having at least one hydroxy group, lipocyclic esters having at least one hydroxy group or mixtures thereof.

4. The method of claim 1, wherein the ester compound having at least one hydroxy group comprises 2-hydroxyethyl acrylate, 2-hydroxyethyl methacrylate, 2-hydroxypropyl acrylate, 2-hydroxypropyl methacrylate, 4-hydroxy-butyl acrylate, pentaerythritol triacrylate, 2-hydroxyethyl acetate, methyl-3-hydroxy butyrate, ethyl-3-hydroxy butyrate, methyl-2-hydroxy isobutyrate, ethyl-2-hydroxy isobutyrate, methyl-3-hydroxy-2-methyl propionate, 2,2-dimethyl-3-hydroxy propionate, ethyl-6-hydroxy hexanoate, t-butyl-2-hydroxy isobutyrate, diethyl-3-hydroxy glutarate, ethyl lactate, isopropyl lactate, butyl lactate, butyl isobutyl lactate, isobutyl lactate, ethyl mandelate, dimethyl tartrate, diethyl tartrate, dibutyl tartrate, trimethyl citrate, triethyl citrate, ethyl-2-hydroxy caproate, diethyl bis-(hydroxy methyl) malonate 2-hydroxyethyl benzoate, 2-hydroxyethyl salicylate, methyl 4-(hydroxy methyl) benzoate, methyl 4-hydroxy benzoate, ethyl 3-hydroxy benzoate, 4-methyl salicylate, ethyl salicylate, phenyl salicylate, propyl-4-hydoxy benzoate, phenyl-3-hydroxy naphthanoate, monoethyleneglycol monobenzoate, diethyleneglycol monobenzoate, triethyleneglycol monobenzoate, hydroxybutyrolactone or mixtures thereof.

5. The method of claim 1, wherein the silane compound having at least one alkoxy group is represented by the general formula:

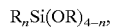

$$R_nSi(OR)_{4-n},$$

wherein

R represents a hydrocarbon which has one to six carbons, and n is 0, 1, 2, or 3.

6. The method of claim 1, wherein the silane compound having at least one alkoxy group comprises dimethyldimethoxysilane, dimethyldiethoxysilane, diphenyl-dimethoxysilane, methylphenyldimethoxysilane, diphenyldiethoxysilane, ethyltrimethoxysilane, vinyltrimethoxysilane, methyltrimethoxysilane, phenyltrimethoxysilane, methyltriethoxysilane, ethyltriethoxysilane, vinyltriethoxysilane, butyltriethoxysilane, phenyltriethoxysilane, ethyltriisopropoxysilane, vinyltributoxysilane, tetraethylorthosilicate, tetrabutylorthosilicate or mixtures thereof.

7. A catalyst for polymerization or copolymerization of an olefin prepared by the method of claim 1.

8. The method of claim 1, wherein the molar ratio of the magnesium compound to the aluminum compound used in the preparation ranges from about 1:0.01 to about 1:2.

9. The method of claim 1, wherein the molar ratio of the magnesium compound to the ester compound which has at least one hydroxy group used in the preparation ranges from about 1:0.01 to about 1:5.

10. The method of claim 1, wherein the molar ratio of the magnesium compound to the silane compound which has at least one alkoxy group used in the preparation ranges from about 1:0.01 to about 1:2.

11. The method of claim 1, wherein the aluminum compound is selected from the group consisting of aluminum halides, aluminum alkoxides, and aluminum hydroxide.

* * * * *